United States Patent [19]
Vieten et al.

[11] Patent Number: 5,575,150
[45] Date of Patent: Nov. 19, 1996

[54] STIFFNESS ENHANCED ELECTROHYDROSTATIC ACTUATOR

[75] Inventors: Kurt W. Vieten, Binghamton, N.Y.;
Marvin V. Nordby, Newport Beach;
Sandor Dobos-Bubno, Torrance, both
of Calif.

[73] Assignee: Northrop Grumman Corporation, Los Angeles, Calif.

[21] Appl. No.: 420,937

[22] Filed: Apr. 12, 1995

[51] Int. Cl.⁶ .......................... F16D 31/02; F15B 11/08
[52] U.S. Cl. ........................ 60/476; 91/415; 91/420; 91/436; 91/465
[58] Field of Search .......................... 60/405, 473, 475, 60/476, 460, 466, 468, 477, 493, 494; 91/415, 420, 436, 454, 455, 462, 465

[56] References Cited

U.S. PATENT DOCUMENTS

| | | |
|---|---|---|
| 2,657,533 | 11/1953 | Schanzlin et al. |
| 3,408,035 | 10/1968 | Lathrop II et al. |
| 3,747,351 | 7/1973 | Wilkerson et al. |
| 3,908,687 | 9/1975 | Wood. |
| 3,974,742 | 8/1976 | Johnson .......................... 91/420 |
| 4,266,464 | 5/1981 | Baatrup et al. .......................... 91/420 X |
| 4,286,432 | 9/1981 | Burrons et al. .......................... 91/420 X |
| 4,293,051 | 10/1981 | Nishikawa .......................... 60/405 X |
| 4,669,494 | 6/1987 | McBeth .......................... 91/420 X |
| 5,136,929 | 8/1992 | Kervagoret. |
| 5,214,997 | 6/1993 | Lebret .......................... 91/420 |

FOREIGN PATENT DOCUMENTS 872471  7/1961  United Kingdom .......................... 60/476

Primary Examiner—Hoang Nguyen
Attorney, Agent, or Firm—Terry J. Anderson; Karl J. Hoch, Jr.

[57] ABSTRACT

Disclosed is a stiffness enhanced electrohydrostatic actuator for aircraft flight controls which eliminates the requirement for a central hydraulic system. The actuator replicates the blocked port condition of the central hydraulic system to provide static and dynamic stiffness by the use of valves having a first sleeve and spool and a second sleeve and spool disposed on either side of a valve seat with the first spool biased towards the valve seat.

11 Claims, 5 Drawing Sheets

STIFFNESS ENHANCED ELECTROHYDROSTATIC ACTUATOR

BACKGROUND OF THE INVENTION

This invention relates generally to improvements in hydraulic actuators and more specifically in stiffness enhancement and load holding capability for electrohydrostatic actuators for aircraft.

Hydraulic actuators (also called rams, jacks or cylinders) position loads in response to directed hydraulic fluid from servomotors. Conventional aircraft hydraulic systems utilize one or more hydraulic pumps to supply pressurized fluid to multiple actuators. Load positioning of each specific actuator is accomplished by metering fluid flow with servovalves to one side or the other of the actuator piston. After the load has been positioned, the servovalve is closed, thus allowing the actuator to hold its position. State-of-the-art design and fabrication of servovalves has resulted in acceptable positioning and load holding stiffness for aircraft control actuators.

Conventional hydraulic actuators suffer from undersirable characteristics, which include unwanted heat generation, and the need for multiple hydraulic systems per aircraft. Unwanted heat generation occurs frequently due to hydraulic system pump pressures being set to accommodate the highest load that any one actuator on an aircraft may encounter. Since most actuator operation is on an intermittent basis and at low loading conditions, much energy is wasted in providing high pressure hydraulic fluid in a standby mode. Servovalve quiescent leakage also contributes to unwanted heat generation, due to manufacturing tolerance limitations. The overall heat generated is transferred through the hydraulic system and ultimately reduces the life of actuator components. Cooling systems (heat exchangers) are required to transfer the heat away from the hydraulic fluid, leading to system weight penalties. Aircraft safety requires that redundant piping systems be used for all flight critical control surfaces. This adds weight, complexity, and reduced hydraulic system reliability.

In moving to make modern aircraft more fuel efficient, safe, and less vulnerable, government agencies have requested the development of actuation systems which do not require the need for centralized hydraulic systems. The Integrated Actuator Package (IAP) and Electrohydrostatic Actuator (EHA) are two potential solutions to this problem.

The IAP is an actuator which is powered by an actuator mounted electric motor driven hydraulic pump. The electric motor is of constant speed and of unidirectional rotation. Actuator direction is controlled by a servovalve which directs fluid flow in a conventional manner, or by controlling an over-center variable displacement pump mechanism. The latter method controls both hydraulic flow direction and flow rate. The IAP eliminates the piping of the conventional hydraulic system, but not the waste heat generated by a conventional system. This is because the motor and pump must rotate at a constant speed to maintain a high fluid pressure.

The EHA is similar in design to the IAP, in that an electric motor driven pump is mounted to the actuator. The major difference between the two configurations is that the EHA electronic controller actually reverses the electric motor and pump direction to change actuator direction, thus eliminating the need for a servomotor or other position control mechanisms. The EHA electronic controller generates the speed and direction of rotation for the motor which in turn develops the pressure and flow required to position and hold the actuator load. The EHA electronic controller is more complex than the IAP controller, however fluid heating is significantly reduced and external cooling is not required. The end result is an EHA that operaters in a true power on demand mode which is energy efficient.

The elimination of the conventional servovalves in EHAs creates deficiencies in which uncommanded static and dynamic load carrying capability may be lost. The capability to hold static and dynamic loads in the presense of load disturbances is referred to as actuator stiffness. The loss of stiffness is primarily linked to the EHA's inability to seal off the actuator cylinder ports at both static and oscillating load conditions. Fluid compressibility is also an important contributor, since it is affected by fluid type, temperature, air content, and operating pressure. Other factors which can affect stiffness are piston area, cylinder volume, and component mechanical stiffness.

Conventional actuators use a high operating pressure to counteract the degradation in fluid stiffness caused by high operating temperatures and dissolved and entrained air. EHAs and IAPs have closed fluid systems, therefore they can be completely deaerated. The EHA can also be operated at lower fluid temperatures since it is a power on demand system, resulting in a fluid stiffness that is greater than or equivalent to systems utilizing high operating pressures.

Conventional actuators are typically designed with extend piston areas being larger than retract piston areas, and are therefore called unbalanced actuators. Unbalanced actuator designs are lighter, shorter, and are less expensive than their balanced design counterparts. The area unbalance creates an excess or need for hydraulic fluid, depending on the direction of actuator motion. Unbalanced EHAs and IAPs require a bi-directional anti-cavitation valve and a reservoir to accommodate differential fluid flow in the actuator, and to prevent cavitation. This requirement results in a degradation of an EHA's actuator stiffness because one side of the piston is connected to the reservoir whenever a significant load is placed on the actuator. There exists, therefore, a significant need for a means of improving the stiffness capabilities of an EHA, such that it can duplicate the performance of a conventional central hydraulic system.

The present invention is a fast operating stiffness enhancement and load holding valve arrangement which provides energy reduction operating advantages for either conventional servovalve controlled actuators, IAPs and EHAs. Its maximun value is, however, in stiffness enhancement and energy reduction for EHAs and the description of the invention is directed relative to its use as part of an EHA.

SUMMARY OF THE INVENTION

In accordance with the invention, a stiffness enhanced electrohydrostatic actuator is provided which includes an actuator extend chamber and an actuator retract chamber separated by a piston having an actuator ram. The hydraulic system includes an extend valve and a retract valve each having a first sleeve and spool and a second sleeve and spool disposed on either side of a valve seat with the first spool biased towards the valve seat. A variable speed, reversible electric motor/hydraulic pump is provided to supply high pressure hydraulic fluid to either the actuator extend chamber through the extend valve or to the actuator retract chamber through the retract valve. Pressure is relieved from the retract chamber when high pressure hydraulic fluid is supplied to the extend chamber and likewise pressure is relieved from the extend chamber when high pressure hydraulic fluid is supplied to the retract chamber. Hydraulic fluid flow is blocked at both static and dynamic conditions.

In an alternative embodiment, the extend and retract valves are in-line and the second sleeves and second spools are integral. A further alternative is to provide a redundant system in which there are two (2) extend valves, two (2) retract valves, and two (2) hydraulic pumps in the system.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
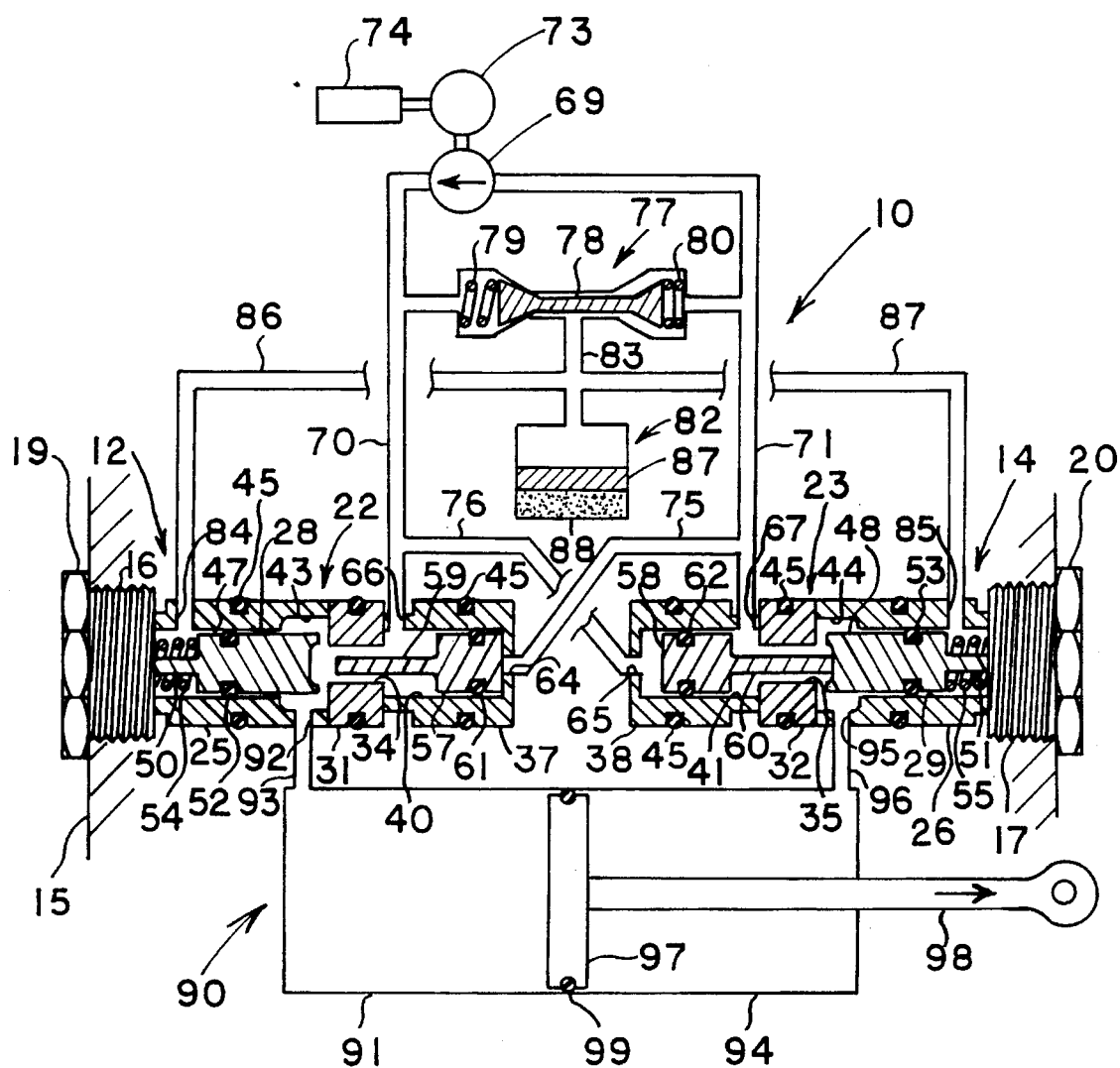
FIG. 1 is a diagramatic view of the stiffness enhanced electrohydrostatic actuator including the valves of the present invention illustrating the commanded extension of the actuator ram.
Figure 2:
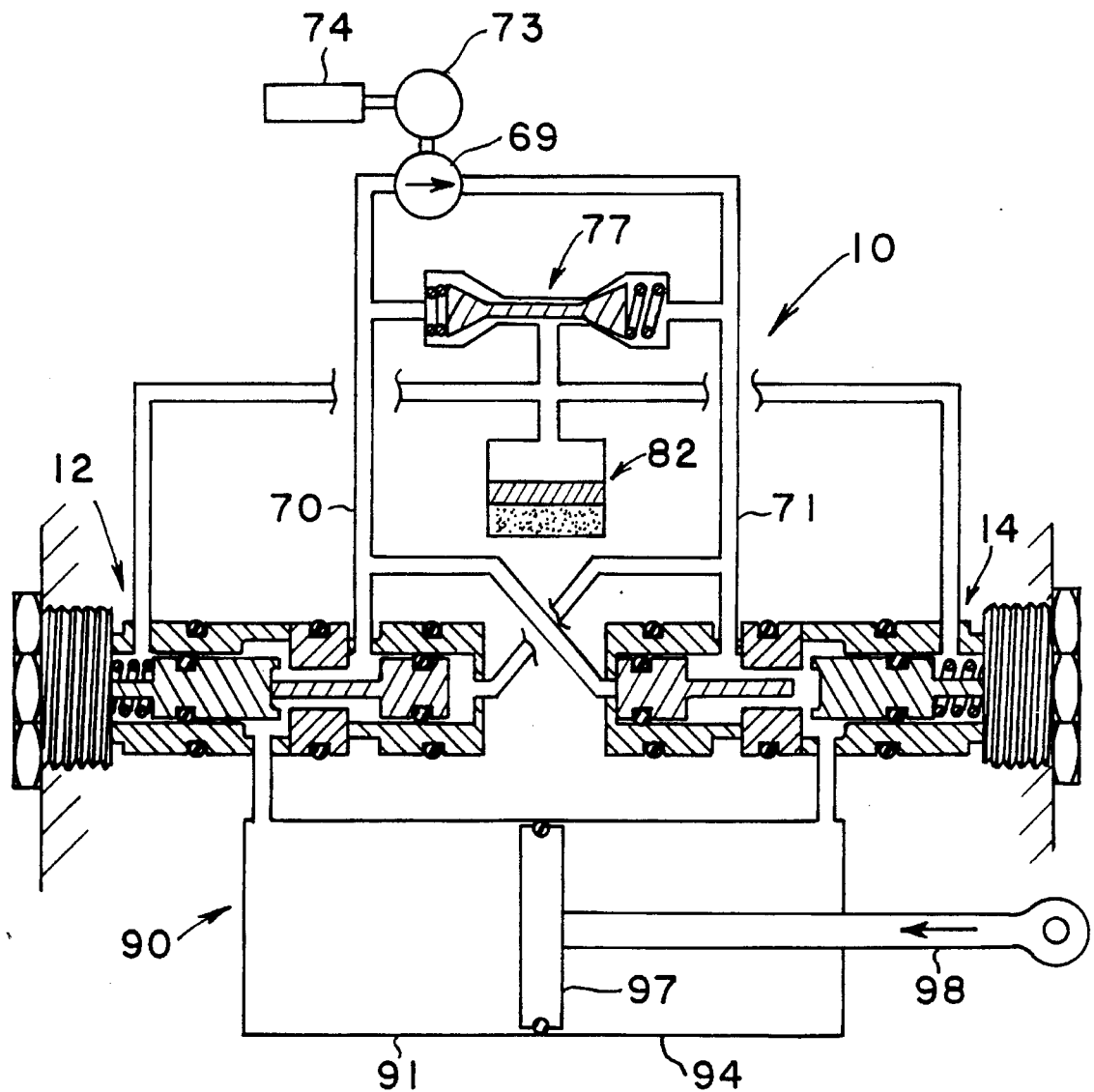
FIG. 2 is a diagramatic view of the stiffness enhanced electrohydrostatic actuator including the valves of the present invention illustrating the commanded retraction of the actuator ram.
Figure 3:
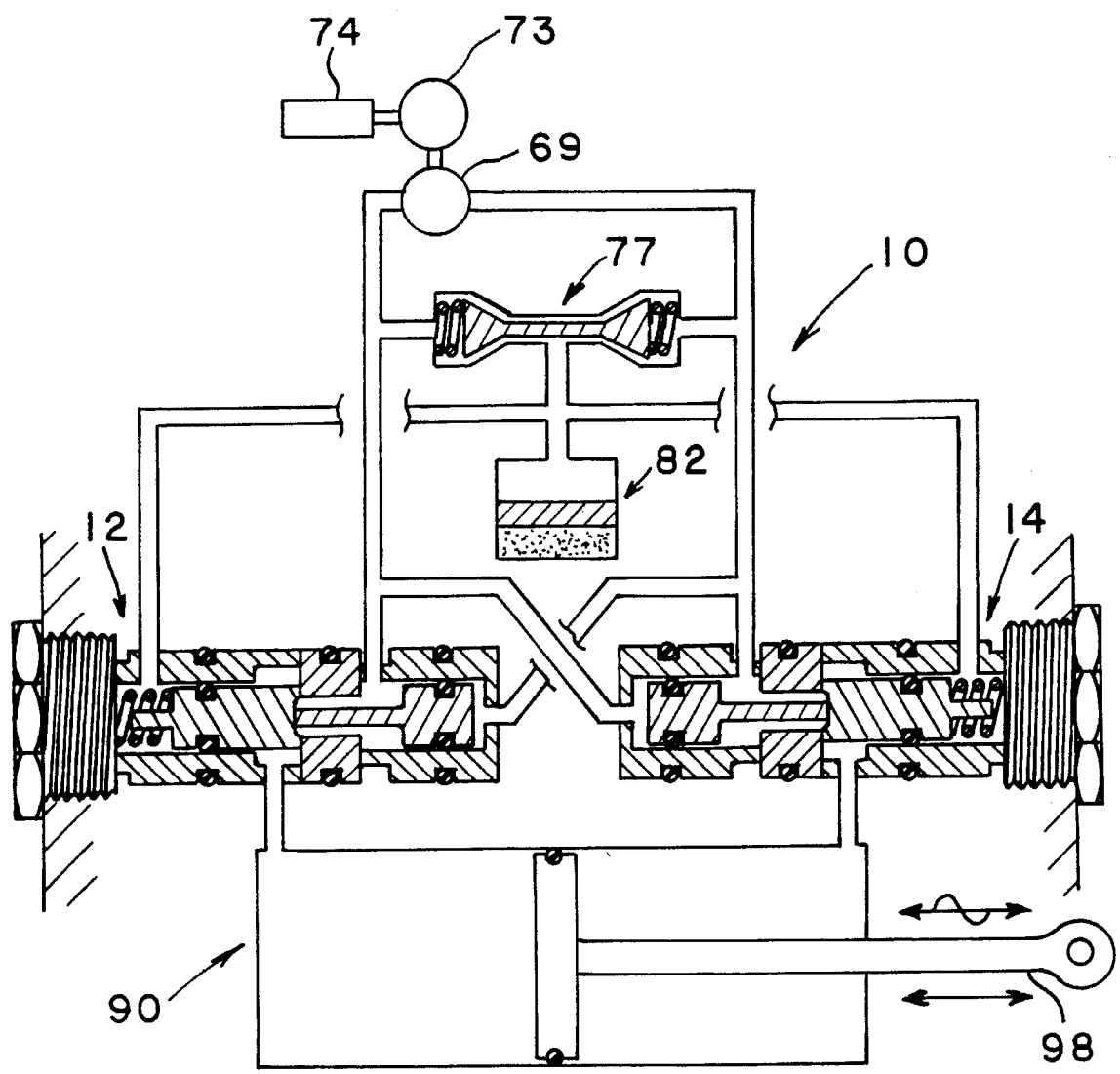
FIG. 3 is a diagramatic view of the stiffness enhanced electrohydrostatic actuator including the valves of the present invention illustrating the valves holding static loads and/or subjected to high frequency oscillating loads.

As illustrated in FIGS. 1–3, the stiffness enhanced electrohydrostatic actuator 10 includes extend valve 12 and retract valve 14 each inserted and retained in the manifold 15. The extend valve 12 and retract valve 14 are identical and each includes a threaded base 16,17 having a bolt head 19,20 and also a valve body or sleeve assembly 22,23.

Each sleeve assembly 22,23, respectively, includes a first sleeve 25,26 having a central cylinderical bore 28,29, a valve seat 31,32 having central cylindrical bore 34,35, and a second sleeve 37,38 having central cylindrical bore 40,41. The first central cylindrical bores 28,29 are of the same diameter as the second central cylindrical bores 40,41 but have an enlarged cylindrical bore section 43,44 at the valve seat end thereof. The valve seat central cylindrical bore 34,35 has a diameter reduced from the diameter of the first and second central bores 28,29,40,41. Each sleeve asssembly 22,23 also includes a plurality of gaskets or low friction ring seals 45.

A first spool slide 47,48 having a spigot 50,51 extending towards the threaded base 16,17 is disposed in the first central cylindrical bore 28,29 with low friction ring seal 52,53. A spring 54,55 is disposed around spigot 50,51 to bias the first spool slide 47,48 towards the valve seat 31,32. A second spool slide 57,58 having spigot 59,60 extending towards valve seat 31,32 is disposed in the second central cylindrical bore 40,41 with low friction ring seal 61,62.

The second sleeve central cylindrical bore 40,41 includes end port 64,65 at one end thereof and high pressure port 66,67 near the valve seat 31,32. The high pressure port 66 of the extend valve 12 is connected to one side of pump 69 by conduit 70 while conduit 71 connects the high pressure port 67 of the retract valve 14 to the opposite side of the pump 69, which may be any reversible, variable speed, positive displacement pump such as a multiple piston or gear pump. The pump 69 is driven by a reversible, variable speed electric motor 73 having a controller 74, with the pump discharge rate a function of the speed at which the pump is driven. The end port 64 of the extend valve 12 is connected to the retract valve high pressure port conduit 71 by conduit 75 while conduit 76 connects the extend valve high pressure port conduit 70 to end port 65 of the retract valve 14.

Disposed between pump conduits 70,71 is anti-cavitation valve 77 including a spool 78 which when the motor/pump is not powered is balanced between springs 79 and 80 at opposite ends thereof. A low pressure reservoir 82 is connected to the anti-cavitation valve 77 by conduit 83 as are the low pressure ports 84,85 of the extend valve 12 and retract valve 14 by conduits 86 and 87 respectively. The reservoir 82 includes a piston 87 operating against a nitrogen gas chamber 88.

The hydraulic actuator cylinder 90 includes an extend chamber 91 connected to the actuator port 92 at the enlarged cylindrical bore section 43 of the extend valve 12 by conduit 93 and retract chamber 94 is connected to the actuator port 95 at the enlarged cylindrical bore section 44 of retract valve 14 by conduit 96. The extend chamber 91 and retract chamber 94 are separated by a piston 97 which includes actuator ram 98. The piston 97 may include low friction ring seal 99 to help seal between the extend chamber 91 and the retract chamber 94.

FIG. 1 illustrates the operation of the stiffness enhanced electrohydrostatic actuator 10 during extension of the actuator ram 98. When the actuator 10 is commanded to extend by a closed loop electronic control system (not shown) that utilizes sensed actuator ram position, the motor controller 74 directs the electric motor 73 to drive the pump 69 in the direction to pressurize conduit 70 which delivers high pressure hydraulic fluid to extend valve high pressure port 66. Pressurizing conduit 70 accomplishes a number of tasks including forcing second spool 59 to the right to close end port 64 and forcing first spool 47 to the left to overcome spring 54 and unseat the first spool 47 from valve seat 31 so as to allow an unrestricted flow path from the pump 69 to the extend chamber 91 through actuator port 92 and conduit 93. Additionally, through conduit 76, high pressure hydraulic fluid is provided to end port 65 of the retract valve 14 to move both second spool 58 and first spool 48 to the right to permit an unrestricted flow path from the retract chamber 94 to the low pressure side of the pump 69. The anti-cavitation valve 78 is shuttled by the high pressure hydraulic fluid in conduit 70 forcing the spool 78 to the right. Connecting the low pressure ports 84 and 85 to the reservoir 82 allows fluid volume changes to occur within the valves 12,14 without corresponding pressure fluctuations.

The application of high pressure hydraulic fluid to the extend chamber 91 and relief of pressure from the retract chamber 94 forces the actuator piston 97 to move to the right and extend the actuator ram 98 in the direction of the arrow in FIG. 1.

When the motor 73 is reversed to in turn reverse the pump 69, conduit 71 is pressurized to retract the actuator ram 98 as shown in FIG. 2. The manner of retracting the actuator ram 98 is identical in operation to extending the actuator ram 98 as described with respect to FIG. 1 except that the high pressure hydraulic fluid is established through the retract valve 14 and low pressure is through the extend valve 12. In addition, the high pressure hydraulic fluid in conduit 71 will close the anti-cavitation valve 77 in the opposite direction.

The stiffness enhanced electrohydrostatic actuator 10 is illustrated in a static condition in FIG. 3. In this condition, all ports connected to the pump 69 are at the low pressure of the reservoir 82 and the first spool slide 47,48 is seated against valve seat 31,32 by spring 54,55. This effectively disconnects the actuator 90 from pump 69, sealing off pressure contained in chambers 91 and 94 in an attempt to replicate the blocked port function of a servovalve.

In this condition the actuator 90 can hold static loads without requiring minimal initial power from the pump 69. Once the pump 69 has pressurized either actuator chamber 91,94, (depending on external load) to counteract the load, spool slides 47,48 close, sealing off pressures contained in chambers 91,94. The blocked port condition also enables the actuator 90 to maintain its commanded position with oscillating load disturbance frequencies up to 30 hertz and beyond. With the motor 73, pump 69, and reservoir 82 all essentially disconnected from the actuator 90, dynamic stiffness is maintained.

This is to be contrasted with a standard electrohydrostatic actuator in which at least one of the actuator cylinder chamber is always fluidly connected to the pump. In this situation, static loads are capable of back driving the pump which can cause the actuator ram to move in a uncommanded direction. This actuator position error will cause the electric motor to rotate the pump, pressurizing an actuator chamber and returning the actuator ram to its commanded position, all of which utilizes electrical energy. The inability to hold a commanded actuator ram position is also aggrevated by any pump leakage.

A standard electrohydrostatic actuator system's ability to resist oscillating loads over a full range of frequencies is also reduced by the fact that at least one of the actuator cylinder chambers is always fluidly connected to the pump. Additionally, when the standard electrohydrostatic actuator is subjected to a high frequency oscillating load (typically well beyond 30 hertz), one cylinder chamber is typically fluidly connected to the pump, with the other cylinder chamber being fluidly connected to the reservoir due to the position of the anti-cavitation valve. Connecting to the pump is not favorable because of the leakage and backdriving tendencies referred to above, while connecting to the reservoir provides an additional loss of stiffness since the reservoir is at low pressure which is unfavorable since the actuator chamber requires pressure to prevent motion.

Figure 4:
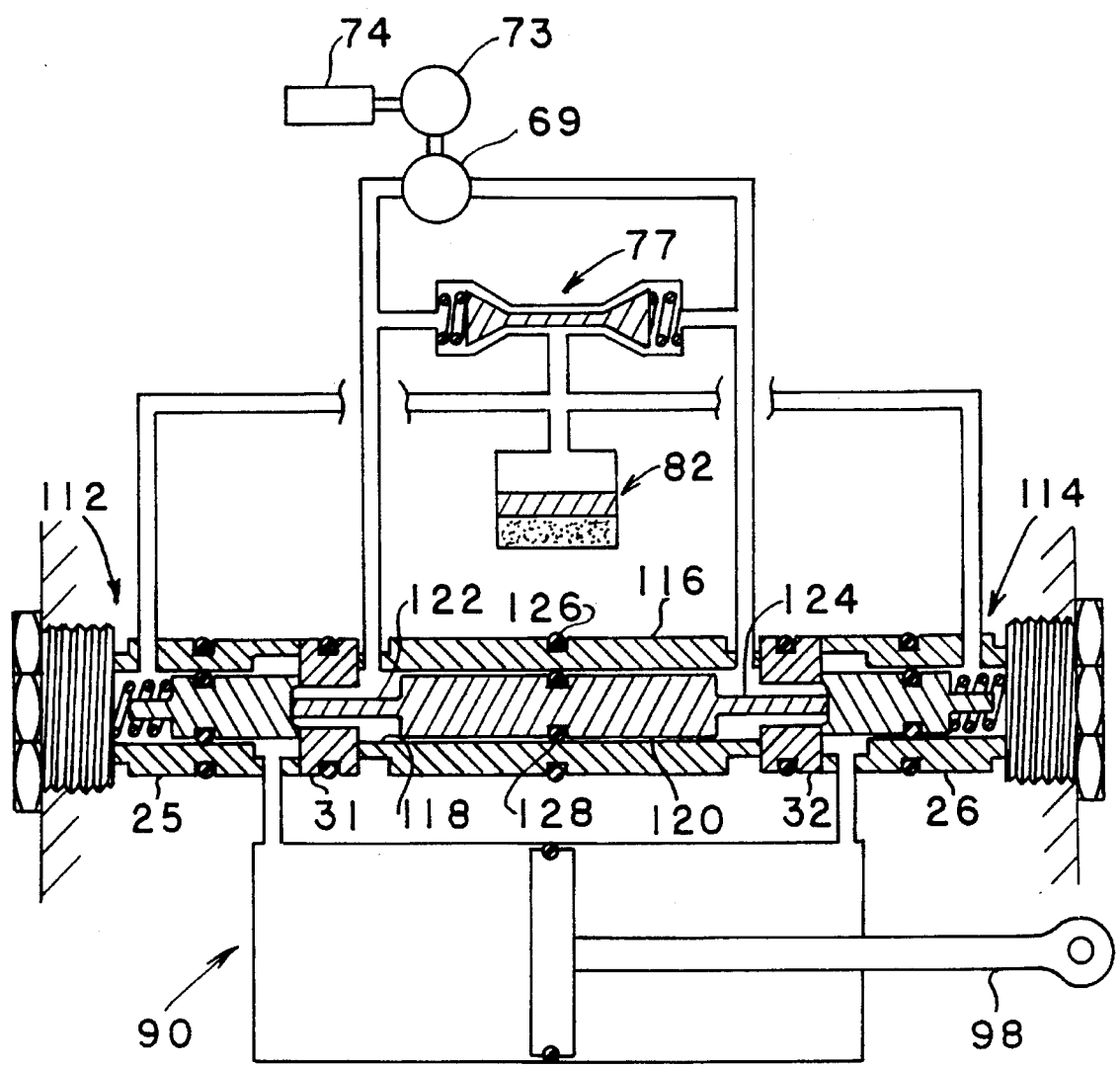
FIG. 4 is a diagramatic view of the stiffness enhanced electrohydrostatic actuator including alternate embodiment valves of the present invention.

In the alternate embodiment of the present invention shown in FIG. 4, the extend valve 112 and retract valve 114 share a middle sleeve 116 having a middle sleeve slide spool 120. Thus, while the first sleeve 25,26, first spool slide 47,48, and valve seat 31,32 remain the same, the second sleeves 37,38 are combined into an integral middle sleeve 116 between valve seats 31,32, and the second spool slides 57,58 are combined into an integral middle spool slide 120 in the central cylindrical bore 118 of the middle sleeve 116. Spigots 122 and 124 extend from the middle spool slide 120 towards valve seats 31,32 respectively. The exterior of the middle sleeve 116 includes low friction ring seal 126 while the middle spool slide 120 includes low friction ring seal 128.

The remainder of the alternate embodiment of FIG. 4 is identical to FIGS. 1–3 except that the need for the end ports 64,65 and conduits 75,76 has been eliminated. Functionally, this alternate embodiment is the same as previously described and the choice as to which embodiment might be preferred would depend upon the specific actuator application. Obviously, the FIG. 4 embodiment requires that the extend valve 112 and retract valve 114 be in-line.

Figure 5:
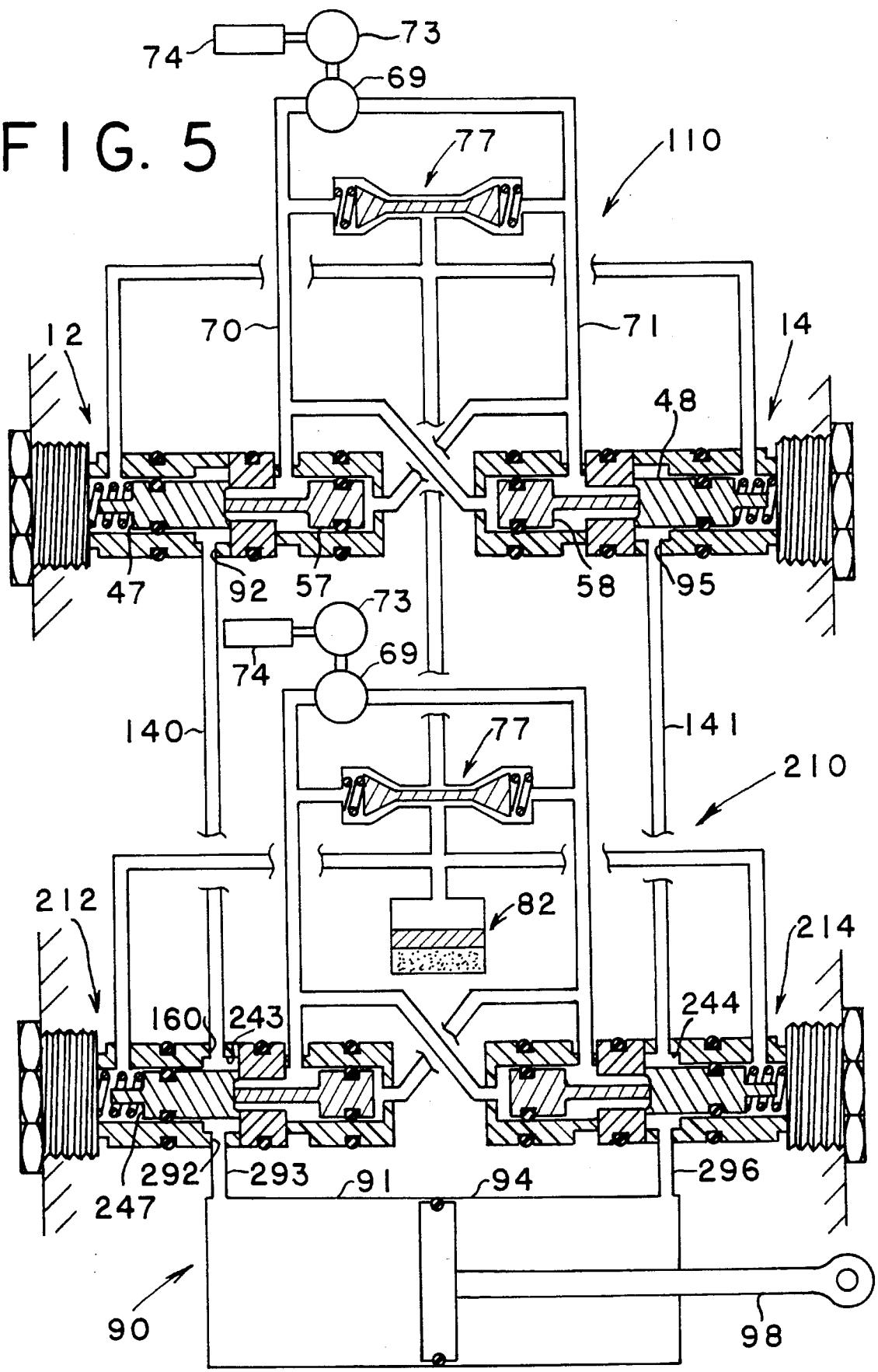
FIG. 5 is a diagramatic view of an alternate embodiment electrohydrostatic actuator having redundant motor pumps and valves.

In critical flight control actuators for aircraft, the redundant system of FIG. 5 may be required to guarantee actuator operation in the event of a failure such as the motor 73 or pump 69. In this embodiment, there is provided two (2) complete systems each capable of operating independently to provide high pressure hydraulic fluid to the actuator 90. The only system component that is not totally redundant is the low pressure reservoir 82 with redundancy possible here if required.

The primary actuator 110 is identical in all respects to that described in FIGS. 1–3 except that is does not include a separate low pressure reservoir but instead utilizes the low pressure reservoir 82 of the secondary system 210. The extend valve 12 and retract valve 14 operate as previously described, providing high pressure hydraulic fluid either to extend chamber 91 through conduit 140, the enlarged cylindrical bore section 243 of secondary extend valve 212, and conduit 293 or alternately to retract chamber 94 through conduit 141, the enlarged cylindrical bore section 244 of secondary retract valve 214, and conduit 296.

When the pump 69 of the primary system 110 is directed to extend the actuator ram 98, high pressure hydraulic fluid is pumped into conduit 70 forcing first spool slide 47 to the left and second spool slide 57 to the right to from a flow path to conduit 140 which delivers the high pressure hydraulic fluid to port 160 of the secondary extend valve 212. The enlarged cylindrical bore section 243 of the secondary extend valve 212 permits the high pressure hydraulic fluid to proceed around the first spool slide 247, through port 292 and conduit 293 to extend chamber 91.

With the valve seat diameter the same as the diameter of the valve slide spool and the hydraulic pressure on the tail end of the valve slide spool referenced to the reservoir, cylinder pressure does not affect either the opening or the closing motion of the valve spool slide. Flow through the valve is achieved simply by raising pump pressure to a level higher than the slide spool spring force. This results in a low force, fast operating valve, suitable for dynamic applications such as aircraft flight controls. With response times as quick as 10 milliseconds required, such applications are ideally suited for these valves. Other commercial/industrial applications with similar requirements could also utilize these valves. All of this is achieved with an unbalanced actuator since the two (2) actuator chambers do not have the exact same volume with the actuator ram extending through one of the chambers.

With the valve ports blocked to improve actuator stiffness under static conditions, quick disengagement is possible when actuator movement is required. In addition, the pump is not required to provide fluid pressure to hold the actuator position. This results is a lower energy requirement and allows operation at a lower temperature which will result in extending the service hours between required maintenance actions.

The redundant system permits actuator operation with one or both motor pumps providing pressurized hydraulic fluid yet achieves the same blocked port condition under static loads. Such redundant motor pumps are required for critical flight control actuators to guarantee continued actuator operation in the event of a motor pump failure.

A wide variety of modifications and improvements to the stiffness enhanced electrohydrostatic actuator described herein are believed to be apparent to those skilled in the art. Accordingly, no limitation on the present invention is intended by way of the description herein, except as set forth in the appended claims.

What is claimed is:

1. An enhanced stiffness electrohydrostatic actuator, comprising:

an actuator including an extend chamber and a retract chamber which are separated by a piston having an actuator ram extending therefrom; and a hydraulic system fluidly coupled to said actuator and comprising:

an extend valve fluidly coupled to said extend chamber;

a retract valve fluidly coupled to said retract chamber; and a hydraulic pump fluidly coupled to said extend and retract valves for alternatively supplying high pressure hydraulic fluid to said extend chamber via said extend valve and said retract chamber via said retract valve;

said extend and retract valves being in fluid communication with said actuator, said pump, and each other, and operable to isolate said extend and retract chambers from said pump when static loads and high frequency oscillating loads are applied to said actuator ram.

2. The actuator of claim 1 wherein said extend and retract valves are identically configured, and each comprise:

a valve seat defining opposed sides;

a first sleeve disposed on one side of the valve seat;

a first spool disposed within the first sleeve;

a biasing spring disposed within said first sleeve for biasing said first spool toward said valve seat;

a second sleeve disposed on the side of the valve seat opposite the first sleeve; and a second spool disposed in the second sleeve.

3. The actuator of claim 2 wherein the extend and retract valves are linearly aligned, with the second sleeves and the second spools thereof being integrally connected to each other.

4. The actuator of claim 1 further comprising a second hydraulic system fluidly coupled to said actuator and comprising:

a second extend valve fluidly coupled to the extend chamber;

a second retract valve fluidly coupled to the retract chamber; and a second hydraulic pump fluidly coupled to said second extend and retract valves for alternatively supplying high pressure hydraulic fluid to said extend chamber via said second extend valve and said retract chamber via said second retract valve.

5. The actuator of claim 1 wherein said hydraulic pump comprises a reversible, variable speed pump.

6. The actuator of claim 5 further comprising a variable speed, reversible electric motor mechanically coupled to said pump.

7. The actuator of claim 1 further comprising on anti-cavitation valve fluidly coupled to said extend and retract valves and to said pump.

8. The actuator of claim 7 further comprising a pressure reservoir fluidly coupled to said anti-cavitation valve and to said extend and retract valves.

9. A stiffness enhanced electrohydrostatic actuator, comprising:

an actuator including an extend chamber and a retract chamber which are separated by a piston having an actuator ram extending therefrom;

an extend valve having an actuator port, an end port, and low and high pressure ports;

a retract valve having an actuator port, an end port, and low and high pressure ports;

a reversible, variable speed hydraulic pump;

a reversible, variable speed electric motor mechanically coupled to the pump;

an anti-cavitation valve;

a pressure reservoir;

a first conduit fluidly coupling the pump to the high pressure port of the extend valve;

a second conduit fluidly coupling the pump to the high pressure port of the retract valve;

a third conduit fluidly coupling the first conduit to the end port of the retract valve;

a fourth conduit fluidly coupling the second conduit to the end port of the extend valve;

a fifth conduit fluidly coupling the reservoir to the anti-cavitation valve;

a sixth conduit fluidly coupling the low pressure ports of the extend and retract valves to the fifth conduit and to each other;

a seventh conduit fluidly coupling the actuator port of the extend valve to the extend chamber of the actuator; and an eighth conduit fluidly coupling the actuator port of the retract valve to the retract chamber of the actuator;

said extend and retract valves being in fluid communication with the conduits, and operable to isolate the extend and retract chambers of the actuator from the pump and the reservoir except when movement of the actuator ram is commanded.

10. The actuator of claim 9 wherein the extend and retract valves are identically configured, and each comprise:

a valve seat defining opposed sides and a central opening;

a first sleeve defining a first end adjacent one side of the valve seat and an opposed second end, said first sleeve including a central bore having an enlarged section formed at the first end, said low pressure port communicating with the central bore at the second end of the first sleeve and said actuator port communicating with the enlarged section of the central bore at the first end of the first sleeve;

a second sleeve defining opposed first and second ends with said first end being adjacent the side of the valve seat opposite the first end of the first sleeve, said second sleeve including a central bore, said high pressure port communicating with said central bore at the first end of the second sleeve and said end port communicating with the central bore at the second end of the second sleeve;

a first spool disposed within the central bore of the first sleeve;

a biasing spring disposed within the central bore of the first sleeve for biasing the first spool toward the valve seat; and a second spool disposed within the central bore of the second sleeve, said second spool including a spigot portion extending into the central opening of the valve seat;

the extension of the actuator ram being facilitated by the pressurization of the first conduit by the pump which unseats the first spool of the extend valve from the valve seat to provide a flow path for pressurized hydraulic fluid to the extend chamber via the extend valve and the seventh conduit, the pressurized hydraulic fluid simultaneously pressurizing the third conduit thereby unseating the first spool of the retract valve from the valve seat to provide a flow path for low pressure hydraulic fluid from the retract chamber to the pump via the eighth conduit, the retract valve and the second conduit, and a flow path from the first sleeve of the retract valve to the reservoir, the anti-cavitation valve, and the first sleeve of the extend valve via the fifth and sixth conduits;

the retraction of the actuator ram being facilitated by the pressurization of the second conduit by the pump which unseats the first spool of the retract valve from the valve seat to provide a flow path for pressurized hydraulic fluid to the retract chamber via the retract valve and the eighth conduit, the pressurized hydraulic fluid simultaneously pressurizing the fourth conduit thereby unseating the first spool of the extend valve from the valve seat to provide a flow path for low pressure hydraulic fluid from the extend chamber to the pump via the seventh conduit, the extend valve and the first conduit, and a flow path from the first sleeve of the extend valve to the reservoir, the anti-cavitation valve, and the first sleeve of the retract valve via the fifth and sixth conduits.

11. The actuator of claim 10 wherein the extend and retract valves are linearly aligned, with the second sleeves and second spools thereof being integrally connected to each other.

* * * * *